United States Patent [19]
Hansson et al.

[11] Patent Number: 5,945,804
[45] Date of Patent: Aug. 31, 1999

[54] METHOD AND DEVICE FOR CONTROLLING THE VOLTAGE ACROSS INDIVIDUAL CELLS IN A BATTERY

[75] Inventors: Magnus Hansson, Malmö; Björn Frännhagen, Lund, both of Sweden

[73] Assignee: Telefonaktiebolaget LM Ericsson, Stockholm, Sweden

[21] Appl. No.: 08/919,284

[22] Filed: Aug. 28, 1997

[30] Foreign Application Priority Data

Aug. 30, 1996 [SE] Sweden ................................. 9603151

[51] Int. Cl.$^6$ ......................... H01M 10/44; H01M 10/46
[52] U.S. Cl. .......................................... 320/119; 320/122
[58] Field of Search ................................ 320/116, 117, 320/118, 119, 120, 122, 132, FOR 114, FOR 115, FOR 116, FOR 118, FOR 142, DIG. 21

[56] References Cited

U.S. PATENT DOCUMENTS

| | | |
|---|---|---|
| 5,387,857 | 2/1995 | Honda et al. ........................... 320/120 |
| 5,469,042 | 11/1995 | Rühling ................................... 320/122 |
| 5,504,415 | 4/1996 | Podrazhansky . | |
| 5,557,189 | 9/1996 | Suzuki et al. ...................... 320/120 X |
| 5,578,914 | 11/1996 | Morita .................................... 320/122 |
| 5,666,040 | 9/1997 | Bourbeau ........................... 320/122 X |

FOREIGN PATENT DOCUMENTS

| | | |
|---|---|---|
| 432 640 | 12/1990 | European Pat. Off. . |
| 662 744 | 7/1995 | European Pat. Off. . |
| 451 924 | 5/1984 | Sweden . |
| WO95/15023 | 6/1995 | WIPO . |

*Primary Examiner*—Edward H. Tao
*Attorney, Agent, or Firm*—Burns, Doane, Swecker & Mathis, L.L.P.

[57] ABSTRACT

Terminal voltage differences are controlled between individual battery cells in a battery during charging. The terminal voltage for each cell is measured, differences between the terminal voltages are determined, and a portion of the charging current is shunted in parallel to any of the cells in response thereto. A shunt device is connected in parallel to the respective battery cell and is arranged to shunt an electric current of a certain magnitude in response to the input signal value on a control input. A controller, with inputs connected to each battery cell and with outputs connected to the control input on the respective shunt device, measures voltage differences between individual cells and controls, in response thereto, the shunt devices for reducing or eliminating the voltage differences. The controller has a charging information history unit and storage means for storing, during an on-going charging cycle, terminal voltage data continuously read for each cell. The history unit is arranged to retrieve and analyze the stored terminal voltage data during a subsequent charging cycle, so as to determine the magnitude and duration of the shunted current.

7 Claims, 1 Drawing Sheet

US 5,945,804

METHOD AND DEVICE FOR CONTROLLING THE VOLTAGE ACROSS INDIVIDUAL CELLS IN A BATTERY

BACKGROUND

The present invention relates to a method and a device for controlling terminal voltage differences between individual battery cells in a battery during the charging thereof, wherein the terminal voltage is measured for each individual battery cell, differences between the terminal voltages are determined, and a portion of the charging current is shunted in parallel to at least one of the battery cells in response to the determined terminal voltage differences.

Rechargeable batteries are used in many different portable applications, such as cellular telephones, communication radios, portable personal computers, video cameras, etc.

In these applications a rechargeable battery comprises a plurality (preferably 2–5) of battery cells, which are connected in series with each other in order to provide, when viewed as a unit, the desired supply voltage of between, for instance, 3 and 6 volt. Conventionally, battery cells of NiCd-type (nickel-cadmium) have been common, but today NiMH-type cells (nickel-metal hydride) as well as Li-type cells (lithium-ion, lithium-polymer) are more common.

It is desired, when charging a battery comprising a plurality of cells, that all cells contained in the battery exhibit essentially the same terminal voltage. In practice, however, there will often be a lack of balance between the cells during the charging, so that one cell will become fully charged after some time, while another cell will still need some time before it becomes fully charged. Such unbalance is undesired from a performance point of view as well as for safety reasons.

In the Swedish patent publication SE 451 924 a regulator is shown for controlling a charging current to an individual cell in a battery of cells. The regulator takes care of the problem of different cells becoming selfdischarged after different periods of time by shunting, by means of a shunt circuit, a portion of the maintenance charging current to the individual cell in response to the difference between the terminal voltage of the cell and a reference voltage. According to this solution the regulator will not become active until at least one battery cell has reached a state of final charging voltage and the battery has entered a state of maintenance charging. The disadvantage of having to postpone the shunting of the charging current, or a portion thereof, until one battery cell has become fully charged, is that the shunted current has a high amperage, which will cause major losses in power due to the generation of heat in the battery.

WO95/15023 relates to a dynamic balancing and monitoring device for an accumulator battery pack. The charging characteristics, or the terminal voltage, of each battery cell is monitored, and if the charging characteristics of a particular battery cell starts to deviate from the rest of the battery cells or from a normal condition, a portion of the charging current to that battery cell is shunted in parallel to the cell. Thus, the charging conditions between the battery cells are automatically balanced or equalized.

EP-0 662 744 relates to a device for balancing the charging conditions between series-connected battery cell pairs. U.S. Pat. No. 5,504,415 relates to a method and an apparatus for equalizing the state of charge among a plurality of series-connected batteries of a similar kind.

SUMMARY

The object of the present invention is to provide a more effective way of balancing the terminal voltages of the different battery cells already early in the charging cycle. This is obtained by methods and devices with the features, described in this application.

A method of controlling terminal voltage differences between individual battery cells in a battery during charging, includes the steps of measuring the terminal voltage for each individual battery cell, determining differences between the terminal voltages, and shunting a portion of the charging current in parallel to at least one of the battery cells in response to the determined terminal voltage differences. Terminal voltage data is continuously measured and stored for each battery cell during an on-going charging cycle. The terminal voltage data thus stored is retrieved and analyzed during a subsequent charging cycle so as to determine a magnitude and duration of the shunted portion of the charging current.

A device for controlling a voltage across individual battery cells in a battery during charging, includes a shunt device for each battery cell that is connected in parallel to the respective battery cell and is arranged to shunt an electric current of a certain magnitude in parallel to the battery cell and in response to an input value on a control input. The device further includes a controller with inputs connected to each battery cell and outputs connected to the control input on the respective shunt device, and the controller is arranged to measure voltage differences between individual battery cells and in response thereto control the shunt devices for reducing or eliminating the voltage differences. The device further inlcudes a charging information history unit with storage means assigned thereto, the charging information history unit being arranged to store terminal voltage data continuously measured for each battery cell during an on-going charging cycle, and to retrieve and analyze the stored terminal voltage data during at least one subsequent charging cycle, so as to determine a magnitude and duration of the shunted current.

BRIEF DESCRIPTION OF THE DRAWINGS

The invention will now be described in more detail in the following, reference being made to the appended drawing, in which.

DETAILED DESCRIPTION

Figure 1:
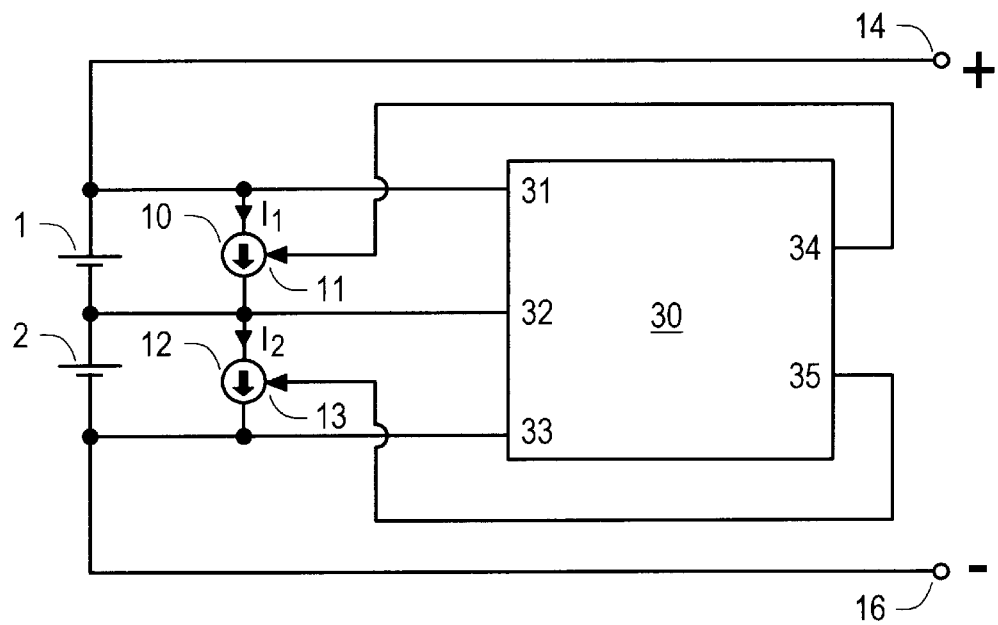
FIG. 1 is a schematic circuit diagram, illustrating a device according to the invention for controlling terminal voltage differences between individual battery cells in a battery during the charging thereof.

FIG. 1 illustrates a situation, in which the method and the device according to the invention may be applied when charging a battery, such as a cellular telephone battery. According to FIG. 1 the battery comprises two identical battery cells 1 and 2, which for instance are of a lithium- or nickel-metal hydride type. Obviously, the discussion below may be applied also to other battery types and to more than two battery cells. The two battery cells 1 and 2 are in a conventional way connected in series with each other and are arranged to receive charging current from a charging device not shown in the drawing via a positive and a negative battery terminal 14 and 16, respectively. Furthermore, the battery cells are arranged to supply power, via the battery terminals 14 and 16, to an arbitrarily chosen electric apparatus, such as a cellular telephone.

Two shunt devices 10 and 12, respectively, are connected in parallel to a respective battery cell 1 and 2. Each shunt device comprises a control input 11 and 13, respectively, by means of which the current $I_1$ and $I_2$, respectively, through the shunt device is controlled. In other words the control input 11 and 13, respectively, controls the fraction of the total charging current to the battery cell, which will bypass the cell. The current control is preferably effectuated by varying the resistance of the shunt device as a function of the magnitude of the input signal on the control input. It is regarded trivial to a man skilled in the technical field to realize a shunt device according to the above—for instance, a simple transistor circuit may be used—and hence the internal design of the shunt devices 10 and 12 is not further discussed herein.

The controlling function of the system has been indicated in the drawing as a function block 30, which hereinafter will be referred to as a controller. The term controller may not be interpreted strictly as a hardware-based unit (which will become apparent when reading the following); on the contrary, the purpose of the term controller is to illustrate a function of the present invention.

The controller 30 comprises a plurality of inputs 31, 32, and 33 as well as a plurality of outputs 34 and 35. Each input 31, 32, 33 is connected to a respective terminal on one of the battery cells 1, 2, as illustrated in FIG. 1. By this arrangement the controller is given the opportunity of continuously reading the terminal voltage of a respective battery cell and in response thereto controlling a suitable shunt device, as will be described below.

Furthermore, the controller 30 comprises outputs 34, 35 for controlling the shunt devices 10, 12. Each output 34, 35 is connected to a respective control input 11, 13 on one of the shunt devices 10, 12. The operation of the controller may be summarized as follows:

Read the momentary values of the terminal voltages for each respective battery cell 1, 2 through the inputs 31, 32, 33.

Retrieve, for each battery cell, charging information history, which has been collected and stored for each respective battery cell during previous charging cycle(s).

Analyze the measurement values and charging information history thus read and determine whether an action is required, i.e. whether any of the shunt devices 10, 12 should be activated for shunting a current $I_2$, $I_2$.

Carry out the activation of the shunt device, if necessary.

Preferably, the procedure described above is continuously repeated during the entire charging process from a fully discharged state to a fully charged state. The controller may be formed as a stand-alone device, comprising analog components, digital gates, and storage means, as a microprocessor with a memory assigned thereto, or as a combination thereof.

Now, a basic embodiment example of the controller will be described with reference to FIG. 2. The overall structure is identical to the one disclosed in FIG. 1, thus not requiring a repeated description of the components, such as the battery cells 1, 2, the shunt devices 10, 12, or the battery terminals 14, 16. The controller 30, which is illustrated as being contained in a dashed frame, consists on its input side of two operational amplifiers 41, 42, the inputs of which, in similarity to the above, are connected to the terminals of a respective battery cell. Hence, the operational amplifier 41 is arranged to detect the terminal voltage of the first battery cell, while the operational amplifier 42 is instead arranged to measure the terminal voltage of the second battery cell 2.

The outputs on the operational amplifiers 41 and 42 are connected to the inputs on a third operational amplifier 43, said amplifier being arranged to supply a voltage on its output, the magnitude of which corresponds to the difference between the terminal voltages of the two battery cells. The sign of this output voltage from the operational amplifier 43 indicates which one of the battery cells 1 or 2, which has the highest terminal voltage.

The output of the operational amplifier 43 is connected to an input on a fourth operational amplifier 44 as well as an input on a fifth operational amplifier 45. The second input on the operational amplifiers 44 and 45, respectively, is connected to a reference voltage source $U_{ref1}$ and $U_{ref2}$ respectively, which for instance may be based upon a respective Zener diode circuit. Preferably, the values of the reference voltages have opposite polarities but are identical as regards the absolute values thereof. The output of the operational amplifier 44 is connected, through a first OR-gate 57, to the control input 11 on the shunt device 10, while the output of the operational amplifier 45 is connected, through a second OR-gate 58, to the control input 13 on the shunt device 12.

The operational amplifiers 44 and 45 are arranged to compare the value of the terminal voltage difference between the battery cells, as received from the operational amplifier 43, to the value received from the respective reference voltage source $U_{ref1}$, $U_{ref2}$, and in response thereto supply a control signal to the respective shunt device 10, 12, once the terminal voltage difference between the battery cells has exceeded the threshold value defined by $U_{ref1}$ and $U_{ref2}$, respectively. In response to the reception of a control signal the shunt device 10 or 12 is activated and shunts a portion $I_1$ or $I_2$ of the charging current to the battery cell 1 or 2. The magnitude of the shunted current $I_1$, $I_2$ may be chosen with respect to the actual application; however, a value of between 10 and 100 mA may be appropriate.

Furthermore, the controller 30 comprises a charging information history unit 50 with a storage means 56 assigned thereto. The charging information history unit 50 is arranged to receive, on its inputs 51 and 52, respectively, the terminal cell voltages for cells 1 and 2, respectively, as measured by the operational amplifiers 41 and 42, respectively. Furthermore, the history unit 50 is arranged to store this charging information or terminal voltage characteristics for each battery cell in the storage means 56, which is operatively connected to the history unit 50 via an interface 55. More specifically, the history unit 50 continuously stores the measurement data received from the amplifiers 41 and 42 together with corresponding timestamp values representing the exact time at which the measurement data was obtained, in order to be able to use this information during subsequent charging cycle(s) and predict the need for an early activation of any of the shunt devices 10 or 12.

Thus, the charging information history unit 50 continuously registers charging information characteristics during the ongoing charging cycle. Simultaneously, the history unit 50 reads charging information history recorded during the previous charging cycle or cycles from the storage means 56 and determines, whether the historic terminal cell voltages exhibit differences with respect to each other, which are large enough for requiring an earlier activation of the proper shunt device 10 or 12. Once the charging information history unit 50 has determined that there is indeed a need for shunting, the unit 50 transmits an activation signal through the output 53 or 54 to the OR-gate 57 or 58, the output of which, as described above, is connected to the control input on the shunt device 11 or 13. In other words, the history unit 50 is able to predict the need for shunting well before the amplifier 44 or 45 detects a sufficiently large difference between the respective terminal cell voltage and the reference voltage $U_{ref1}$, $U_{ref2}$.

Figure 2:
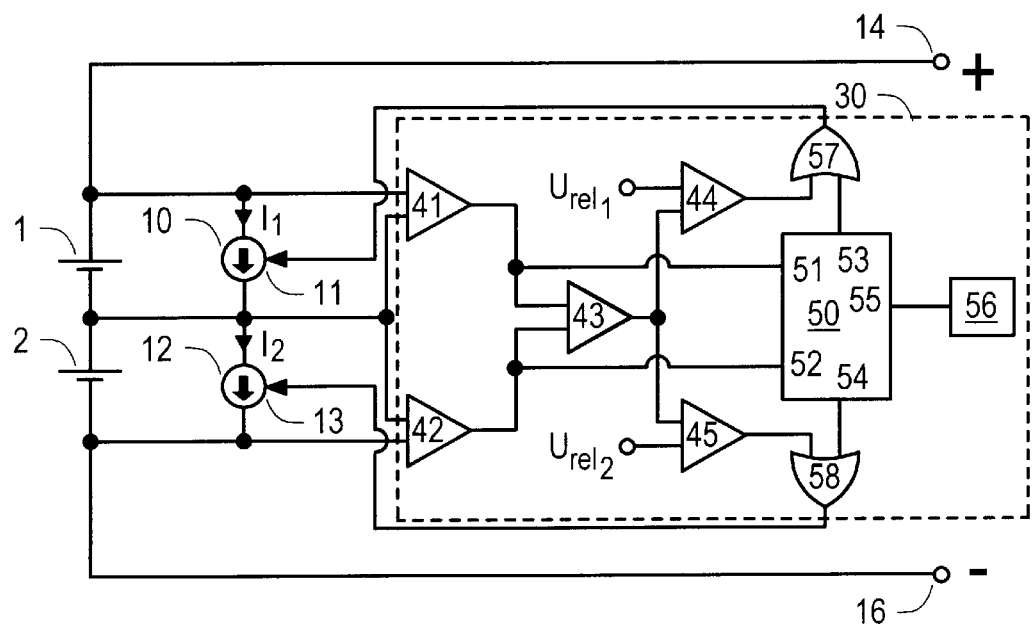
FIG. 2 illustrates a basic embodiment of the device according to FIG. 1.

As already mentioned, the controller according to FIG. 1 or FIG. 2 may be realized in many different ways, and furthermore the function thereof may be varied within the scope of the present invention. Below, a few preferred functional schemes are described for the controller 30.

In its most simple form the controller is arranged to measure the terminal voltage across each battery cell in the battery, as described above, and determine the size of the voltage difference between each pair of battery cells (in the drawing only one pair of cells is illustrated). If the voltage difference exceeds a predetermined threshold value, say 100 mV, the controller 30 activates the appropriate shunt device, so that a current of for instance 100 mA is shunted in parallel to the particular battery cell, which exhibits the higher terminal voltage. In this way the other battery cell will be supplied with a, relatively speaking, stronger charging current, said battery cell thus being given an opportunity to, so to speak, catch up on the first battery cell. The shunted current may be maintained until the battery has become fully charged, but preferably the controller is arranged to detect when the terminal voltage difference has been reduced below a second predetermined threshold value and in response thereto deactivate the shunt device in question.

According to a slightly more advanced alternative the controller is arranged to effectuate shunting of the charging current in cooperation with the shunt devices 10, 12, wherein the magnitude of the shunted current $I_1$, $I_2$ is proportional to the voltage difference between the battery cells. Preferably, the shunting of charging current is started, once the voltage difference exceeds a first threshold value, say 40 mV, wherein a current $I_1$ or $I_2$ of for instance 40 mA is shunted in parallel to the battery cell 1 or 2. If the voltage difference continues to increase, so that the difference becomes e.g. 70 mV, also the magnitude of the shunted current is increased, for instance to 70 mA. Preferably, the magnitude of the current is maximized to a predetermined upper threshold value of, for instance, 100 mA, for practical reasons.

As described above, the controller 30 is arranged to store charging information, which is obtained during the on-going charging cycle, by means of the charging information history unit 50. Such information may be the values of the measured voltage differences at various times during the charging, as well as the magnitude of the shunted current $I_1$, $I_2$ at these moments of time. The controller is provided with a memory, which is capable of storing information during at least the time, which lapses between two subsequent battery chargings.

During the charging process the history unit 50 is arranged to use information from the preceding charging process, so as to predict the need for shunting the charging current to any of the battery cells and in response thereto activate the proper shunt device as soon as possible. Assume for instance that the shunt device 1 was activated after 30 minutes during the previous charging process with a shunt current magnitude $I_1$ of 80 mA. When the battery is to be charged the next time, the history unit 50 uses the information stored in the storage means 56 and will thus activate the shunt device 11 already from the start with a value of $I_1=40$ mA. As a consequence a charging process is obtained, which is more efficient as well as more merciful than the previous charging process. Naturally, the controller 30 monitors the entire charging process and will activate or deactivate the proper shunt device, if necessary. If the external conditions (such as temperature) are unchanged, it will turn out, however, that the charging characteristics for the respective battery cell is normally essentially the same during two subsequent chargings.

The invention may be realized in other ways than the ones described above, which would readily be realized by a man skilled in the technical field in question, within the scope of the present invention, as defined by the appended patent claims. Hence, the description above is only to be regarded as embodiment examples.

What is claimed is:

1. A method of controlling terminal voltage differences between individual battery cells in a battery during charging, comprising the steps of: measuring the terminal voltage for each individual battery cell, determining differences between the terminal voltages, and shunting a portion of the charging current in parallel to at least one of the battery cells in response to the determined terminal voltage differences, wherein terminal voltage data is continuously measured and stored for each battery cell during an on-going charging cycle, and the terminal voltage data thus stored is retrieved and analyzed during a subsequent charging cycle so as to determine a magnitude and duration of the shunted portion of the charging current.

2. A method according to claim 1, wherein the shunting of a portion of the charging current to a certain battery cell is started, once the terminal voltage of the battery cell exceeds a predetermined first reference value, and is stopped, once the terminal voltage of the battery cell sinks below a second predetermined reference value.

3. A method according to claim 1, wherein the magnitude of the shunted portion of the charging current is varied as a function of the terminal voltage of the battery cell.

4. A method according to claim 1, wherein the magnitude of the shunted portion of the charging current is varied as a function of the difference between the terminal voltage of the battery cell in question and the terminal voltage of another battery cell.

5. A method according to claim 3, wherein the magnitude of the shunted portion of the charging current is proportional to said terminal voltage or said terminal voltage difference in a range between a first predetermined minimum current magnitude and a second predetermined maximum current magnitude.

6. A device for controlling a voltage across individual battery cells in a battery during charging, comprising a shunt device for each battery cell, said shunt device being connected in parallel to the respective battery cell and being arranged to shunt an electric current of a certain magnitude in parallel to the battery cell and in response to an input value on a control input, and a controller with inputs connected to each battery cell and outputs connected to the control input on the respective shunt device, said controller being arranged to measure voltage differences between individual battery cells and in response thereto control the shunt devices for reducing or eliminating said voltage differences, a charging information history unit with storage means assigned thereto, said charging information history unit being arranged to store terminal voltage data continuously measured for each battery cell during an on-going charging cycle, and said charging information history unit being arranged to retrieve and analyze the stored terminal voltage data during at least one subsequent charging cycle, so as to determine a magnitude and duration of the shunted current.

7. A rechargeable battery for a portable electric apparatus for radio communication, comprising a battery and a device according to claim 6.

* * * * *